United States Patent [19]

Faulhaber

[11] 3,944,857
[45] Mar. 16, 1976

[54] AIR-CORE ARMATURE
[75] Inventor: Fritz Faulhaber, Vernate, Tessin, Switzerland
[73] Assignee: Retobina Handelsanstalt, Schaan, Liechtenstein
[22] Filed: Sept. 19, 1974
[21] Appl. No.: 507,623

[30] Foreign Application Priority Data
Feb. 28, 1974 Germany............................ 2409681

[52] U.S. Cl. ............................................. 310/266
[51] Int. Cl.² ........................................... H02K 1/22
[58] Field of Search .......................... 310/200–208, 310/265, 266, 268

[56] References Cited
UNITED STATES PATENTS
3,324,323  6/1967  Baudot................................ 310/266
3,356,877  12/1967  Burr..................................... 310/266
3,805,104  4/1974  Margrain et al. ................... 310/266

Primary Examiner—Mark O. Budd
Attorney, Agent, or Firm—Michael J. Striker

[57] ABSTRACT

An air-core armature for electrodynamic machines comprises an elongated insulating strip rolled up to form a spiral structure composed of a plurality of radially successive layers. An armature winding is comprised of at least one armature coil. The armature coil is comprised of a plurality of electrically interconnected (e.g., series connected or parallel-connected) component coils. Each of the component coils is formed of electrically interconnected conductor sections printed on both sides of the insulating strip. The component coils are located on different respective ones of the radially successive layers of the spiral structure, but occupy substantially the same circumferential sector of the spiral structure, and accordingly are substantially juxtaposed in direction radially of the spiral structure.

8 Claims, 5 Drawing Figures

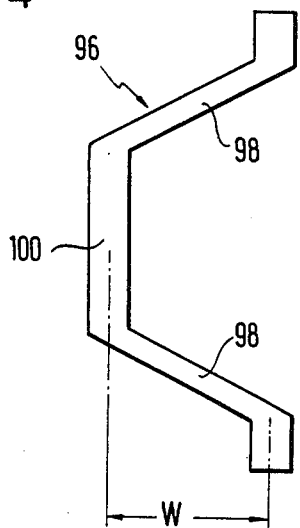
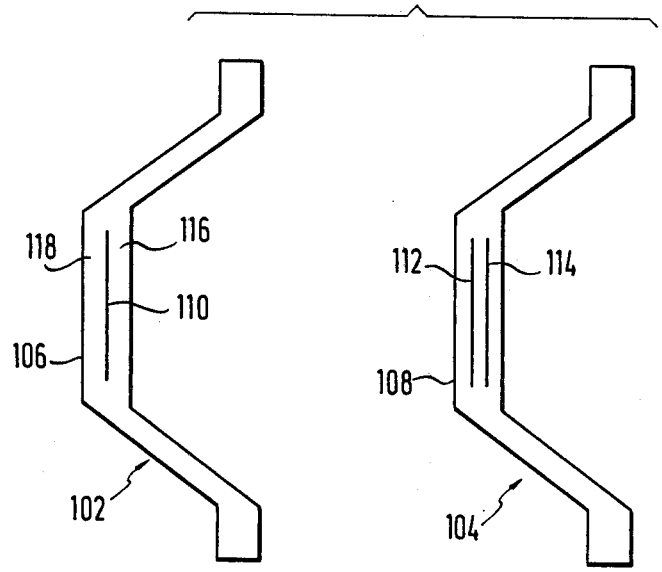

AIR-CORE ARMATURE

BACKGROUND OF THE INVENTION

The invention relates to an electrical armature for air-core-armature motors provided with suitable current collector arrangements connected to an iron-free armature which is mounted for turning movement in a magnetic field. More particularly, the invention relates to an air-core armature formed from an elongated insulating strip which is rolled up to form a spiral and which is printed for example by etching, on both its sides with electrical conductor portions forming winding sections electrically interconnected with each other to form component coils.

Electrical windings are already known wherein the electrically interconnected conductor portions which form the component coils are printed onto the opposite sides of an insulating strip which is rolled up to form a spiral armature structure. With the exception of the end conductor portions, the conductor portions are directly electrically connected to each other from one to the other side of the carrier strip. The end conductor portions are connected by way of a second printed winding section printed simultaneously with the first winding section configurated parallel to the first winding section on the same insulating carrier strip. This is for the specific purpose of forming complete, closed electrical current paths on the carrier strip even before the carrier strip is rolled up to form the spiral armature structure. Accordingly, because the complete closed windings are formed on the flat strip prior to the rolling up of the strip, the windings are ready to use immediately upon rolling up of the strip.

SUMMARY OF THE INVENTION

In contrast to the known structure just described, the present invention has for its aim the provision of a type of air-core-armature structure such that when the carrier strip is rolled up to form the spiral armature structure, each circumferential sector of the spiral armature structure can be occupied by as many radially juxtaposed component coils as possible. This is in contrast to the prior art where, because complete closed current paths are formed before the carrier member with the printed conductor sections is rolled up, it is not possible for example to change the number of series-connected component coils occupying a particular circumferential sector and together constituting one armature coil. With the invention, however, no such limitations need exist.

It is a further object of the invention to optimize the configuration of the winding sections with respect to their torque-creating properties.

These objects, and others which will become more understandable from the following description of preferred embodiments, can be met, according to one advantageous concept of the invention by providing an air-core armature for electrodynamic machines, comprising, in combination, an elongated insulating strip rolled up to form a spiral structure composed of a plurality of radially successive layers; and an armature winding comprised of at least one armature coil, said armature coil being comprised of a plurality of electrically interconnected component coils, each of said component coils being formed of electrically interconnected conductor sections printed on both sides of said strip, said component coils being located on different respective ones of said radially successive layers but occupying substantially the same circumferential sector of said spiral structure and accordingly being substantially radially juxtaposed with each other.

Preferably there is only one component coil per radial successive layer.

Preferably, each component coil is provided with a circumferentially extending electrically conductive extension which extends in direction opposite to the direction of advancement of the respective component coil, in such a manner that for example in an armature coil comprised of two series-connected or parallel-connected component coils, the component coils, which are located on different layers of the spiral armature structure, are substantially exactly radially juxtaposed. The two circumferentially extending electrically conductive extensions are advantageously of the same length and together with each other have a circumferential length equal to the circumferential length of the two respective component coils taken together.

In consequence of the equal-length dimensioning of the circumferentially extending electrically conductive extensions, in the manufacture of the windings the same photomasks can be used for printing conductor sections onto both sides of the insulating carrier strip.

The novel features which are considered as characteristic for the invention are set forth in particular in the appended claims. The invention itself, however, both as to its construction and its method of operation, together with additional objects and advantages thereof, will be best understood from the following description of sepcific embodiments when read in connection with the accompanying drawing.

BRIEF DESCRIPTION OF THE DRAWING

FIG. 4 is a view of a winding section comprised of an axially extending portion of considerable length; and FIG. 5 is a view of a modification of the winding section shown in FIG. 4.

DESCRIPTION OF THE PREFERRED EMBODIMENTS

Figure 1:
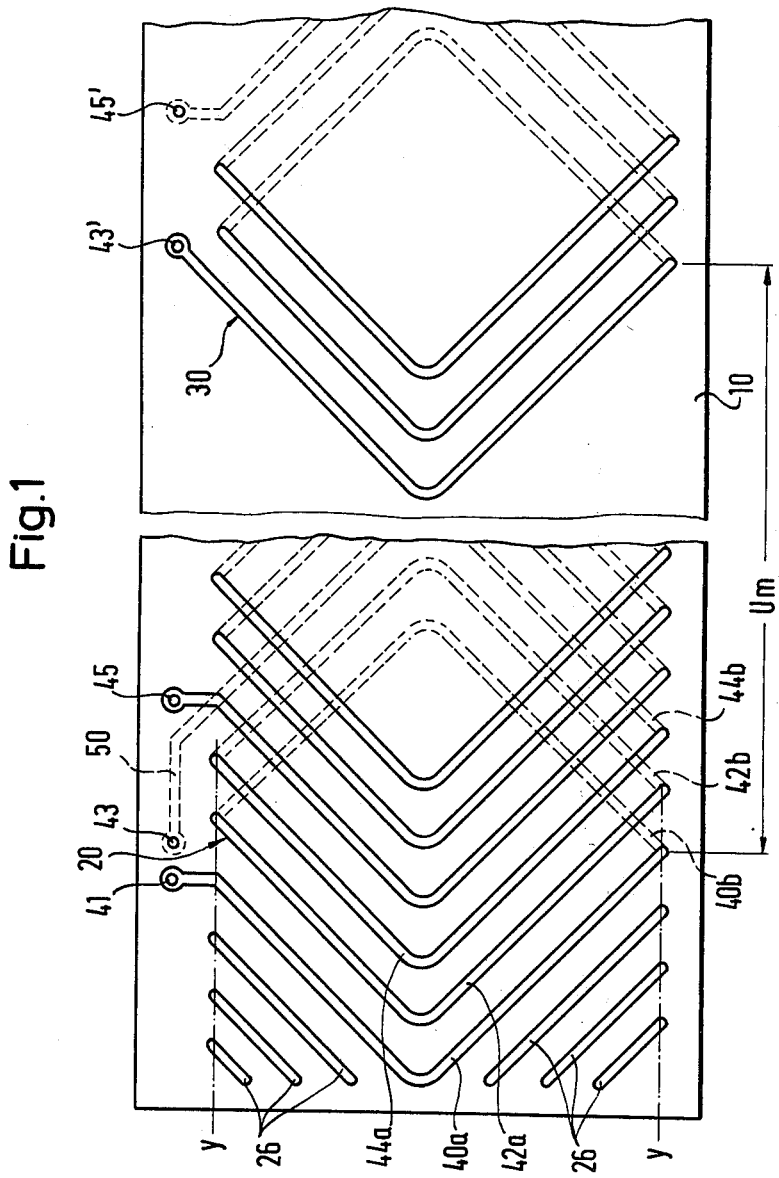
FIG. 1 depicts an insulating carrier strip printed on both sides with electrical conductors to form winding sections and adapted to be rolled up into a spiral armature structure.

FIG. 1 depicts a thin band- or ribbon-like flexible insulating strip 10 composed of suitable insulating material and having a thickness of for example 0.02 to 0.03 mm. Printed onto both sides of the insulating strip 10 are electrical conductors which together form a winding. The insulating strip 10, in non-illustrated manner, is rolled up into a spiral, to form a spirally configurated armature structure composed of a plurality of radially successive layers. The resulting armature structure is connected in suitable manner with a collector to feed current into and out of the armature winding when the armature rotates.

The insulating strip of FIG. 1 extends for a length greater than the circumference of one layer of the spirally configurated armature to be formed; that is, the length of the strip 10 is greater than the circumference of one turn of the spiral with $U_m$ in FIG. 1 designating the average circumference of a turn of the spiral. If the spirally configurated armature is composed of a plurality of complete spiral turns, then both the circumference and the diameter of each turn of the spiral will differ from one such turn to the next; this fact must be taken into account when establishing connections between the conductors on different turns of the spiral.

In FIG. 1 those parts of the winding which are printed on the upper face of the strip 10—i.e., the face of the strip 10 which faces the viewer—are shown in solid lines, whereas those parts of the winding which are printed on the reverse face of the strip are shown in broken lines.

When the insulating strip 10 is printed on both sides with winding sections together forming component coils and then wound up to form a spirally configurated armature, corresponding portions on successive turns of the spiral, separated from each other by a circumferential distance approximately equal to the average spiral turn circumference $U_m$, will radially juxtaposed. If now such component coils are suitably connected to each other from one layer of the armature spiral to the next layer, then selected component coils located on different layers of the armature spiral can be electrically connected in circuit with each other. For example, different component coils can be electrically connected with each other in parallel to create a greater current-carrying capacity, or else different winding sections can be electrically connected with each other in series to create a greater voltage capacity. A plurality of series-connected or parallel-connected component coils forms a single armature coil. The armature winding may be comprised of one or more of such armature coils.

In FIG. 1 the start of the printed component coil 20 is designated by reference numeral 41. From there, the component coil 20 extends successively along the winding sections 40a, 40b, 42a, 42b, 44a and 44b to the soldering spot 43. The start 41 of the component coil 20 as well as the winding sections 40a, 42a and 44a are located on the front face of the insulating strip 10, whereas the winding sections 40b, 42b and 44b as well as the soldering spot 43 are located on the back face of the insulating strip 10. The winding sections located on the back face of the insulating strip are connected with the winding sections located on the front face at the axial levels designated y in FIG. 1, the electrical material of the front and back winding sections passing through the material of the insulating strip 10 at the axial levels y, so that the three front winding sections 40a, 42a, 44a together with the three back winding sections 40b, 42b, 44b together form a single component coil 20.

The soldering spot 43' constitutes the start of a further component coil 30 which, analogously to the component coil 20 already described, is composed of three winding sections located on the front face of the insulating strip and three winding sections located on the back face of the insulating strip, the component coil 30 ending at the soldering spot 45', with the six winding sections being electrically connected together in the manner previously described to form the component coil 30. It will be understood that the portion of the strip 10 located between the component coil 20 and the component coil 30 is occupied by one or more non-illustrated additional component coils. The distance, measured in the direction of elongation of the strip, between the soldering spots 43 and 43' corresponds to the average spiral turn circumference $U_m$. Accordingly, when the insulating strip 10 with the conductors printed on both sides thereof is properly rolled up into a spiral, the solder spots 43 and 43' will become radially juxtaposed. To assure that the component coils 20 and 30 are to find themselves radially juxtaposed—i.e., located on corresponding circumferential sectors of neighboring layers of the spiral—there is provided on the last winding section 44b of the component coil 20 a printed conductor extension 50. The extension 50 is integral with the last winding section 44b, extends in the direction of elongation of the strip 10 and furthermore extends in direction opposite to the direction in which the component coil 20 extends relative to its starting point 41. The solder spot 43, constituting the end of the component coil 20, is provided at the end of the extension 50.

A further (non-illustrated) insulating strip is provided and is wound up into a spiral together with the insulating strip 10, in order to insulate the conductors on the facing sides of radially successive layers of the spiral from each other. The soldering spots 43 and 43' of the two radially juxtaposed component coils 20 and 30 on the radially juxtaposed layers of the spirally wound strip 10 are connected together by an electrical throughconnection which penetrates the material of the additional insulating strip just referred to. In this manner there are effected electrical connections between component coils on different layers of the spirally wound strip 10. The soldering spot 43', as already explained, constitutes the start of the component coil 30 which extends to and ends at the soldering spot 45'. In the assembled armature, the soldering spot 45' and the soldering spot 45 are radially juxtaposed and electrically connected to each other by means of an electrical through connection which penetrates through the material of spirally wound additional insulating or separating strip referred to above. The soldering spot 45 constitutes the start of a further, only partially illustrated component coil.

With this approach, it is advantageous to increase the capacity of the armature by providing on each circumferential sector as many winding sections as possible or else to make the winding sections as wide as possible, i.e., so as to increase the electrical conductivity of the winding sections.

Figure 2:
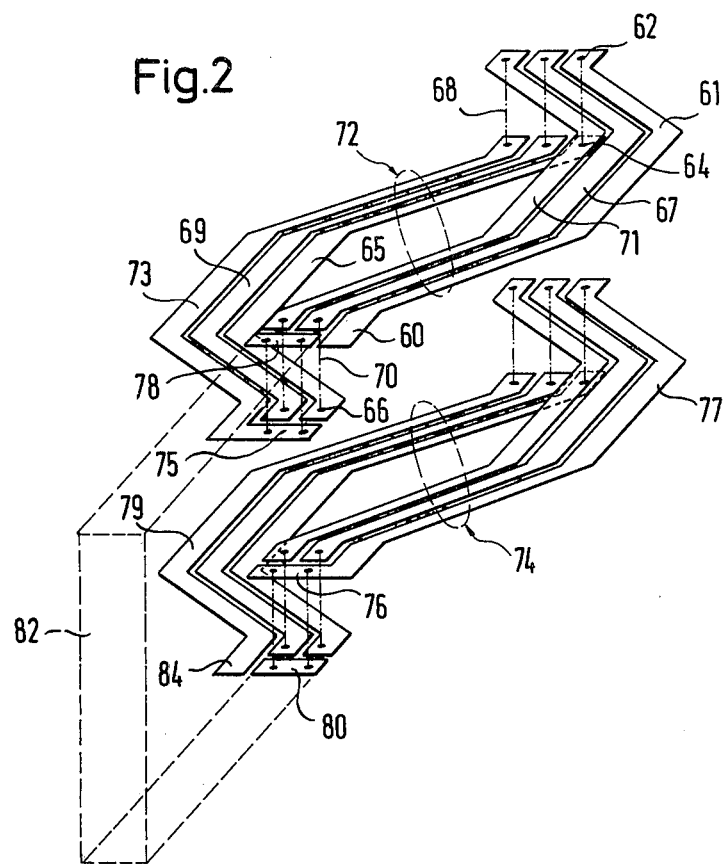
FIG. 2 is a perspective exploded view of another embodiment of the invention.

FIG. 2 depicts in a developed, exploded perspective view an armature coil formed from two component coils electrically connected to each other, according to another embodiment of the invention. Merely by way of example, the winding in the embodiment of FIG. 2 is of the lapped diamond type (the winding in the embodiment of FIG. 1 not being of the diamond type). For the sake of greater clarity, the intermediate insulating strip corresponding to strip 10 of FIG. 1 has been omitted in FIG. 2. However, it is to be understood that in FIG. 2 the two component coils 72, 74 are located on radially juxtaposed circumferential sectors of neighboring layers of the non-illustrated spirally wound insulating strip 10.

With respect to the component coil 72, it will be appreciated that the three winding sections 61, 67, 71 are printed onto one face of the non-illustrated insulating strip corresponding to the strip 10 of FIG. 1, whereas the other three winding sections 65, 69, 73 of the component coil 72 are printed onto the opposite face of substantially the same portion of the insulating strip.

The flow of current begins at portion 60 of the winding section 61 and proceeds through winding section 61 to portion 62. The portion 62 is electrically connected to the portion 64 of the next winding section 65, located on the opposite face of the non-illustrated insulating strip, by means of electrically conductive material passing through the insulating strip in the region of the portions 62, 64. Accordingly, current flows from portion 64 through the winding section 65 to the portion 66 of winding section 65. Electrically conductive material 70 passing through the non-illustrated insulating strip electrically connects portion 66 to the winding section 67. The current flows through the winding section 67, then flows through the winding section 67, then through the winding section 69, then through the winding section 71 and then, by means of the electrical through connection 68, to the last winding section 73 of the component coil 72.

The winding section 73 is provided at its end with an integral electrically conductive extension 75. The extension 75 extends in direction circumferentially of the armature, when the insulating strip with the printed conductors is wound into a spiral to form the armature. A similar extension 76 is provided at the end of the winding section 77 of the radially juxtaposed component coil 74 located on the neighboring layer of the armature spiral. This extension 76 likewise is formed integral with the corresponding winding section 77.

The two electrically conductive extensions 75, 76 are electrically connected to each other. Current flows into the second component coil 74 through the conductive extension 76 and then flows through the six winding sections of component coil 74, in a manner analogous to the flow of current through the six winding sections of component coil 72 described above. The end of the component coil 74, as considered in the direction of travel of the current referred to above, is the portion 84.

In the embodiment of FIG. 2, wherein the component coil 72 is located on one layer of the spiral armature and the component coil 74 on another layer of the spiral armature, for example the adjoining layer, the circumferentially extending conductive extensions 75, 76 are located, in the assembled armature, on sides of the insulating layer which face each other. Because a direct electrical connection between the conductive extensions 75, 76 is harder to establish, use is instead made of island-like conductive sections 78 and 80 connected to respective ones of the conductive extensions 75 and 76 by means of electrical through connections. The island-like conductive sections 78, 80 are electrically connected to each other by means of an overhead connecting element 82 which extends past the edge of the insulating strip, i.e., past the edges of the individual layers of the spiral armature. The overhead connectng element 82 can be soldered to the island-like conductive sections 78 and 80. As a result there is formed one armature coil composed of two component coils (component coils 72 and 74), with each of the two component coils being formed of three complete loops of conductor material.

The conductive extensions 75, 76 elongated in the circumferential direction and extending in direction opposite to the direction of advancement of the winding sections in the upper double layer (i.e., in the component coil 72) in effect retard the advancement of the winding sections, so that the winding sections in the lower double layer (i.e., in the component coil 74) occupy exactly the same circumferential sector of the assembled spirally wound armature as the winding sections of the upper double layer (i.e., in the component coil 72). As a result there can be provided more windings per circumferential sector unit, even when the conductor strips of the windings are wide, than hitherto possible, so that if the windings are connected to each other in series, the resulting armature winding can have applied across it a higher voltage than hitherto.

In the embodiment of FIG. 1, there is provided only a single circumferentially extending conductive extension 50 per winding — i.e., one such extension 50 for each pair of component coils, such as the two component coils 20 and 30. In the embodiment of FIG. 2, on the other hand, each component coil is provided with such a conductive extension 75 or 76. These conductive extensions 75, 76 are essentially equal in length and have a combined length corresponding to the length of the circumferential sector around which the respective component coils extend.

The winding configuration is the same on both sides of the non-illustrated insulating strip 10, although it is of course to be noted that, if the total lengths are the same, then when the insulating strip 10 is formed into a spiral, the lengths of the individual segments will be different, since the radially inner sides will become shorter than the radially outer sides.

The overhead connection 82 by means of a narrow copper strip has the advantage, inter alia, that with the help of these copper strips which, as mentioned above, are soldered to the winding, it is possible to achieve a very good cementing to the collector carried by the winding, since the known cementing materials cement better to metal than to synthetic plastic material. The free overhead connection has the further advantage that in correspondence to the number of armature coils it is possible to use a different number of tags for the collector arrangement, without the use of the printed winding configuration necessitating a prior commitment to a predetermined number of taps.

FIG. 1 depicts a winding arrangement formed by winding sections which are not comprised of axially extending portions of substantial length. Such winding sections are not optimally configured, as will be explained with reference to FIG. 3 which depicts a winding section 90 which is not comprised of an axially extending portion of substantial length. The width of the illustrated winding section 90, as considered in direction circumferentially of the assembled armature, is designated $w_s$. The width of the illustrated winding section 90, as considered in direction transverse to the direction of elongation of each portion of the winding section 90, is designated 92. The width 92 of the winding section, as well known, is dependent upon the ratio of the height (or length) of the armature to the diameter of the armature, and accordingly dependent upon the slop angle. Since iron-free armatures are usually mounted at one axial end on a collector plate, with the other axial end open and not guided, the ratio of the height to the diam- of the armature cannot be made arbitrarily large. With a flat or shallow course or configuration of the conductors — i.e., with a small slope angle — the conductors will be very narrow and have a relatively high resistance. In the region of the turning point 94 of the winding section 90, the associated induction is very small, so that the conductor in the region of this turning point is permeated by only a very small flux, while producing a relatively high resistance.

If now the winding section is provided with an axially extending portion of substantial length, there results a configuration like that depicted in FIG. 4. The winding section 96 depicted in FIG. 4 has a circumferential length w. The winding section 96 is comprised of narrow inclined conductive sections 98 and an axially extending wider conductive section 100. The expression "axially extending" signifies elongation in direction parallel to the elongation of the rotation axis of the assembled armature.

For reasons of geometry, the axially extending section 100 is essentially wider than the narrow conductive sections 98. By so configurating the winding section 96 that it is comprised of the axially extending section 100, the region of low inductance is eliminated, and furthermore the resistance of the section 100 will be considerably smaller than the resistance of the narrow conductor sections 98.

By suitably selecting the circumferential length w of the winding section 96 of FIG. 4, it is possible to achieve an optimum relationship between the magnetic flux permeating the winding section and the resistance of the winding section; that is, the configuration of the winding section can be optimalized relative to the torque which it will contribute in the assembled machine.

Figure 3:
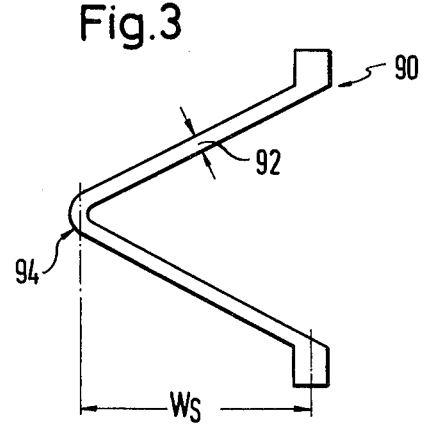
FIG. 3 is a view of a winding section not comprised of an axially extending portion of considerable length.

If the circumferential length $w_s$ of the winding section 90 of FIG. 3, which is not so configurated as to include a substantial axially extending portion, is made equal to one unit length, then according to the invention the optimal circumferential length w for the winding section 96 of FIG. 4, which is so configurated as to include a substantially axially extending portion, is $$w = 0.55(h/d)^{1/3}$$

where h is the height or length of the armature and d is the diameter of the armature. This formula is valid in particular for the technically important range of values of the ratio h/d between about 0.3 and about 3. If the armature or winding is configurated according to this formula, then with given magnets and given geometric dimensions, an optimum torque is achieved.

If the armature winding is formed as a lapped winding composed of winding sections each comprised of an axially extending portion of suitable length, for example more or less similar to the configuration shown in FIG. 4, and furthermore configurated according to the above formula, then the windings will have wide axially extending conductor sections of relatively low resistance. The width of these conductor sections should, on the other hand, not be too great, since otherwise movement of these conductor sections through the stator magnetic field could result in the generation of eddy currents in these conductor sections; as is well known, such eddy currents significantly reduce the efficiency of the machine and significantly increase the apparent resistance of the conductors. Accordingly, in order to fully utilize the width of the axially extending conductor sections, while at the same time reducing to a minimum or even eliminating the establishment of eddy currents in these conductor sections, the invention contemplates slitting at least these axially extending conductor portions one or more times, as shown for example in FIG. 5.

The winding section 102 shown in FIG. 5 is provided at its axially extending wide conductor section 106 with an axially extending slit 110 which subdivides the wide conductor section 106 into two parallel portions 116, 118. The winding section 104 shown in FIG. 5 is provided at its axially extending wide conductor section 108 with two spaced axially extending slits 112, 114 which subdivide the wide conductor section 108 into three parallel portions. The slits 110, 112, 114 extend over substantially the full length of the respective axially extending conductor sections 106, 108. These slits, in a manner not depicted in the drawing, can be of somewhat greater length and have respective end portions which are inclined to the direction of the respective conductor section 106 or 108, and which instead extend in direction substantially parallel to the direction of elongation of the inclined, narrower conductor sections of the illustrated winding sections 102, 104.

As mentioned above, the slit 110 in the axially extending section 106 and the slits 112, 114 in the axially extending section 108 respectively subdivide the sections 106 and 108 into two and three axially extending electrically separated conductor portions of strip-like configuration. These strip-like sections advantageously have a width between 0,4 mm and about 1 mm. because conductor widths less than 1 mm, with present-day thicknesses for the type of printed conductor in question, prevent the establishment of significant flows of eddy currents. Accordingly, the provision of the slits makes it possible to retain the advantage of low resistance which results from the considerable breadth of the axially extending conductor sections while at the same time very effectively counteracting the development of large flows of eddy currents.

By way of example, there was designed a motor having an armature diameter of 50 mm and an armature length of 37 mm as measured in the axial direction, with a power of 50 Watts. Provision of the slits in the wide generally axially extending portions of the winding sections resulted in an efficiency increase of between about 7% and about 9%.

The facing winding sections on the individual layers of the spirally formed armature are physically and electrically separated from each other by means of a thin intermediate insulating layer, for example insulated from each other by a suitable synthetic plastic foil. It will be understood that this additional intermediate insulating layer is spirally wound together with the main insulating layer—i.e., together with the insulating layer which is printed on both sides with winding sections, e.g., the main insulating layer 10 in FIG. 1. In contrast, the winding sections on the radially inwards side of the innermost turn of the spirally turning armature, and likewise the winding sections on the radially outwards side of the outermost turn of the spirally turning armature, are not specially insulated; instead, in order to prevent heat radiation, they are blackened, e.g., blackened by lacquering or by spraying.

As depicted in FIG. 1, the corners of the main insulating strip 10 are provided with conductor sections 26 provided solely for the purpose of avoiding geometrical imbalance in the assembled rotor.

It will be understood that each of the elements described above, or two or more together, may also find a useful application in other types of constructions differing from the types described above.

While the invention has been illustrated and described as embodied in a machine having an iron-free or air-core armature, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended.

1. An air-core armature for electrodynamic machines, comprising, in combination, an elongated insulating strip rolled up to form a spiral structure composed of a plurality of radially successive layers; and an armature winding comprised of at least one armature coil, said armature coil being comprised of a plurality of electrically interconnected component coils, each of said component coils being formed of electrically interconnected conductor sections printed on both sides of said strip, said component coils being located on different respective ones of said radially successive layers but occupying substantially the same circumferential sector of said spiral structure and accordingly being substantially juxtaposed in direction radially of said spiral structure, wherein each of said component coils has one end and an other end, and is comprised at said other end of a circumferentially extending electrically conductive portion extending in the circumferential direction opposite to the direction from said one end to said other end, said circumferentially extending electrically conductive portions being so disposed as to compensate for the difference in circumferential length of different ones of said radially successive layers.

2. An armature as defined in claim 1, wherein the circumferentially extending electrically conductive portions of radially juxtaposed component coils located on neighboring layers of said spiral structure together extend over a circumferential distance substantially equal to the circumferential width of one component coil.

3. An armature as defined in claim 1, wherein said circumferentially extending electrically conductive portions are electrically connected to each other by means of an overhead connection.

4. An armature as defined in claim 3, wherein each of said circumferentially extending electrically conductive portions is electrically connected to said overhead connection through the intermediary of a respective island-like electrically conductive portion located on the respective layer of said spiral structure and printed onto one side of said insulating strip.

5. An air-core armature for electrodynamic machines, comprising, in combination, an elongated insulating strip rolled up to form a spiral structure composed of a plurality of radially successive layers; and an armature winding comprised of at least one armature coil, said armature coil being comprised of a plurality of electrically interconnected component coils, each of said component coils being formed of electrically interconnected conductor sections printed on both sides of said strip, said component coils being located on different respective ones of said radially successive layers but occupying substantially the same circumferential sector of said spiral structure and accordingly being substantially juxtaposed in direction radially of said spiral structure, wherein said plurality of component coils includes two component coils each having a first end and a second end, the first end being the end through which electric current flows into the respective component coil and the second end being the end through which electric current flows out of the respective component coil, and wherein one of said component coils is comprised at said second end of a circumferentially extending electrically conductive portion extending in the circumferential direction opposite to the direction from the respective first end to the respective second end, and wherein the other of said two component coils is comprised at said first end of a circumferentially extending electrically conductive portion extending in the circumferential direction opposite to the direction from the respective second end to the respective first end, said circumferentially extending electrically conductive portions being so disposed as to compensate for the difference in circumferential length of different ones of said radially successive layers.

6. An air-core armature for electrodynamic machines, comprising, in combination, an elongated insulating strip rolled up to form a spiral structure composed of a plurality of radially successive layers; and an armature winding comprised of at least one armature coil, said armature coil being comprised of a plurality of electrically interconnected component coils, each of said component coils being formed of electrically interconnected conductor sections printed on both sides of said strip, said component coils being located on different respective ones of said radially successive layers but occupying substantially the same circumferential sector of said spiral structure and accordingly being substantially juxtaposed in direction radially of said spiral structure, wherein said armature winding is a lapped winding, and wherein said winding sections are comprised of axially extending electrically conductive portions, and wherein each such winding section has a circumferential length which, compared to the circumferential length of a winding section not comprised of such axially extending electrically conductive portions, is given by the formula.

$$w = 0.55 \, (h/d)^{1/3}$$

where $h$ and $d$ are respectively the height and diameter of said spiral structure.

7. An air-core armature for electrodynamic machines, comprising, in combination, an elongated insulating strip rolled up to form a spiral structure composed of a plurality of radially successive layers; and an armature winding comprised of at least one armature coil, said armature coil being comprised of a plurality of electrically interconnected component coils, each of said component coils being formed of electrically interconnected conductor sections printed on both sides of said strip, said component coils being located on different respective ones of said radially successive layers but occupying substantially the same circumferential sector of said spiral structure and accordingly being substantially juxtaposed in direction radially of said spiral structure, wherein said armature winding is a lapped winding, and wherein said winding sections are comprised of axially extending electrically conductive portions of greater breadth connecting together inclined electrically conductive portions of lesser breadth, and wherein said axially extending electrically conductive portions of greater breadth are each provided with at least one axially extending slit to reduce the flow of eddy currents in the material of said axially extending electrically conductive portions without greatly increasing the electrical resistance thereof.

8. An air-core armature for electrodynamic machines, comprising, in combination, an elongated insulating strip rolled up to form a spiral structure composed of a plurality of radially successive layers; and an armature winding comprised of at least one armature coil, said armature coil being comprised of a plurality of electrically interconnected component coils, each of said component coil being formed of electrically interconnected conductor sections printed on both sides of said strip, said component coils being located on different respective ones of said radially successive layers but occupying substantially the same circumferential sector of said spiral structure and accordingly being substantially juxtaposed in direction radially of said spiral structure, wherein said armature further includes insulating material electrically insulating from each other the winding sections on the facing sides of neighboring ones of said radially successive layers, but the radially inner side of the innermost one of said layers and the radially outer side of the outermost one of said layers not being provided with said insulating material and instead being blackened for the purpose of reducing heat radiation.

* * * * *